(12) United States Patent
Goto

(10) Patent No.: US 12,106,584 B2
(45) Date of Patent: Oct. 1, 2024

(54) OBJECT RECOGNITION DEVICE, OBJECT RECOGNITION METHOD, AND STORAGE MEDIUM

(71) Applicant: HONDA MOTOR CO., LTD., Tokyo (JP)

(72) Inventor: Yuhi Goto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 367 days.

(21) Appl. No.: 17/674,875

(22) Filed: Feb. 18, 2022

(65) Prior Publication Data
US 2022/0292848 A1 Sep. 15, 2022

(30) Foreign Application Priority Data
Mar. 9, 2021 (JP) .................. 2021-036873

(51) Int. Cl.
*G06V 20/56* (2022.01)
*G06V 20/58* (2022.01)
*H04N 23/951* (2023.01)

(52) U.S. Cl.
CPC .......... *G06V 20/588* (2022.01); *G06V 20/582* (2022.01); *G06V 20/584* (2022.01); *H04N 23/951* (2023.01)

(58) Field of Classification Search
CPC .. G06V 20/588; G06V 20/582; G06V 20/584; G06V 20/58; G06V 10/22; G06V 10/82; G06V 20/56; G06V 20/54; G06V 10/764; G06V 40/172; G06V 20/64; G06V 10/87; G06V 20/52; G06V 40/161; G06V 10/95; G06V 10/10; H04N 23/951; B60W 60/001; B60W 2420/403; B60W 2552/53;
(Continued)

(56) References Cited

U.S. PATENT DOCUMENTS 10,893,183 B1 * 1/2021 Zou .................. B60R 11/04
2005/0123201 A1 * 6/2005 Nakashima ............ G06T 7/20
382/104
(Continued)

FOREIGN PATENT DOCUMENTS

CN 111721285 9/2020
JP 2005-117231 4/2005
(Continued)

OTHER PUBLICATIONS

Japanese Office Action for Japanese Patent Application No. 2021-036873 mailed Jan. 4, 2023.
(Continued)

*Primary Examiner* — Nimesh Patel
(74) *Attorney, Agent, or Firm* — Amin, Turocy & Watson, LLP

(57) ABSTRACT

An object recognition device of an embodiment includes a processor configured to execute a program to set a high-resolution region to be subjected to a process on a first image obtained by capturing an image of surroundings of a vehicle at a higher resolution than other regions in the first image based on information on the surroundings of the vehicle, and recognize an object located in the surroundings of the vehicle by processing an image corresponding to the set high-resolution region at a high resolution.

13 Claims, 10 Drawing Sheets

(58) Field of Classification Search
CPC .. B60W 2420/40; B60W 40/04; B60W 40/10; B60W 2554/4029; B60W 2555/60; B60W 2520/06; G06N 3/08; G06N 20/00; G06N 3/045; G06N 3/04; G06N 3/0464; G06T 2207/20084; G06T 2207/30252; G06T 2207/20081; G06T 5/50; G06T 2207/10016; G06T 2207/10028; G06T 1/0007; G06T 7/00; G06T 5/00; G06T 7/292; G06T 5/60; G06T 2207/10012; G06T 2207/10048; G06T 15/205; G06T 17/00; G06T 2207/30236; B60R 2300/303; B60R 11/04; B60R 2300/607; B60R 1/24; B60R 2011/004; B60R 1/27; B60R 1/28; B60R 2300/205; B60R 2300/105; B60R 2300/402; B60R 25/305
See application file for complete search history.

(56) References Cited

U.S. PATENT DOCUMENTS

| | | | |
|---|---|---|---|
| 2013/0088597 A1* | 4/2013 | Kadoch | G06V 20/56 348/148 |
| 2017/0174227 A1* | 6/2017 | Tatourian | G06V 20/58 |
| 2019/0096032 A1* | 3/2019 | Li | G06T 3/4053 |
| 2020/0059613 A1* | 2/2020 | Dreier | H04N 25/42 |
| 2020/0175326 A1* | 6/2020 | Shen | G06V 20/58 |

FOREIGN PATENT DOCUMENTS

| | | |
|---|---|---|
| JP | 2010-283567 | 12/2010 |
| JP | 2012-252501 | 12/2012 |
| JP | 2016-038757 | 3/2016 |
| JP | 6412934 | 10/2018 |
| JP | 2019-525568 | 9/2019 |
| JP | 2020-009351 | 1/2020 |
| JP | 2021-013175 | 2/2021 |

OTHER PUBLICATIONS

Japanese Office Action for Japanese Patent Application No. 2021-036873 dated Oct. 11, 2022.

* cited by examiner

OBJECT RECOGNITION DEVICE, OBJECT RECOGNITION METHOD, AND STORAGE MEDIUM

CROSS-REFERENCE TO RELATED APPLICATION

Priority is claimed on Japanese Patent Application No. 2021-036873, filed Mar. 9, 2021, the content of which is incorporated herein by reference.

BACKGROUND OF THE INVENTION

Field of the Invention

The present invention relates to an object recognition device, an object recognition method, and a storage medium.

Description of Related Art

In the related art, a technique of controlling a vehicle by acquiring information on a road or the like on the basis of an image captured by an in-vehicle camera has been known (see, for example, Japanese Unexamined Patent Application, First Publication No. 2012-252501 and Japanese Patent No. 6412934).

SUMMARY OF THE INVENTION

In the related art, in order to acquire accurate information on a road or the like, it is necessary to capture an image at a high resolution and to perform image processing. However, since it takes time to process a high-resolution image, subsequent vehicle control or the like may be influenced. On the other hand, in a case where the range of high-resolution image capture is unnecessarily limited in order to shorten a processing time, there is a possibility of important information that was originally required being missed.

The present invention was made in view of such circumstances, and one object thereof is to provide an object recognition device, an object recognition method, and a storage medium that make it possible to acquire information relating to an object having a high degree of importance among objects located in surroundings of a vehicle in a short time without leaking the information.

The following configurations are adopted in an object recognition device, an object recognition method, and a storage medium according to this invention.

(1) According to an aspect of this invention, there is provided an object recognition device including a processor configured to execute a program to set a high-resolution region to be subjected to a process on a first image obtained by capturing an image of surroundings of a vehicle at a higher resolution than other regions in the first image based on information on the surroundings of the vehicle, and recognize an object located in the surroundings of the vehicle by processing an image corresponding to the set high-resolution region at a high resolution.

(2) In the object recognition device according to the aspect of the above (1), the processor executes the program to recognize the object by processing an image of the high-resolution region in the first image at a high resolution.

(3) In the object recognition device according to the aspect of the above (1), the processor executes the program to recognize the object by processing a second image obtained by capturing a high-resolution image of a region near the vehicle corresponding to the high-resolution region at a high resolution.

(4) In the object recognition device according to any aspect of the above (1) to (3), the processor executes the program to set a region including another vehicle in the first image as the high-resolution region and recognize the another vehicle.

(5) In the object recognition device according to the aspect of the above (4), the processor executes the program to determine a region including the another vehicle by performing image analysis on the first image and set the determined region as the high-resolution region.

(6) In the object recognition device according to the aspect of the above (4) or (5), the processor executes the program to recognize an operation state of the another vehicle based on an image of a lighting portion of the another vehicle included in the image corresponding to the high-resolution region.

(7) In the object recognition device according to any aspect of the above (4) to (6), in a case where there is a first other vehicle traveling in a lane in the same direction as the vehicle in the first image, the processor executes the program to set a region including at least a rear portion of the first other vehicle as the high-resolution region, and in a case where there is a second other vehicle traveling in an opposite lane of the lane in which the vehicle is traveling in the first image, the processor executes the program to set a region including at least a front portion of the second other vehicle as the high-resolution region.

(8) In the object recognition device according to any aspect of the above (1) to (7), the processor executes the program to set a region including a traffic structure in the first image as the high-resolution region and recognize the traffic structure.

(9) In the object recognition device according to the aspect of the above (8), the processor executes the program to determine a region including the traffic structure by performing image analysis on the first image and set the determined region as the high-resolution region.

(10) In the object recognition device according to the aspect of the above (8) or (9), the processor executes the program to determine a region including the traffic structure using map information including road information stored in advance and set the determined region as the high-resolution region.

(11) According to another aspect of this invention, there is provided an object recognition method including causing a computer mounted in a vehicle to: set a high-resolution region to be subjected to a process on a first image obtained by capturing an image of surroundings of the vehicle at a higher resolution than other regions in the first image based on information on the surroundings of the vehicle and recognize an object located in the surroundings of the vehicle by processing an image corresponding to the set high-resolution region at a high resolution.

(12) According to another aspect of this invention, there is provided a non-transitory computer readable storage medium storing a program, the program causing a computer mounted in a vehicle to: set a high-resolution region to be subjected to a process on a first image obtained by capturing an image of surroundings of the vehicle at a higher resolution than other regions in the first image based on information on the surroundings of the vehicle and recognize an object located in the surroundings of the vehicle by processing an image corresponding to the set high-resolution region at a high resolution.

According to aspects of the above (1) to (12), by setting the high-resolution region on the basis of the information on the surroundings of the vehicle, it is possible to make a region which is a target for acquisition of a high-resolution image variable and to acquire a high-resolution image acquisition region by limiting it to a necessary range. This makes it possible to acquire information relating to an object having a high degree of importance among objects located in the surroundings of the vehicle in a short time without leaking the information.

According to the aspects of the above (4) to (7), it is possible to acquire information relating to another vehicle having a high degree of importance located in the surroundings of the vehicle in a short time without leaking the information.

According to the aspects of the above (8) to (10), it is possible to acquire information relating to a traffic structure having a high degree of importance located in the surroundings of the vehicle in a short time without leaking the information.

DETAILED DESCRIPTION OF THE INVENTION

Hereinafter, an embodiment of an object recognition device, an object recognition method, and a storage medium of the present invention will be described with reference to the accompanying drawings.

[Overall Configuration]

Figure 1:
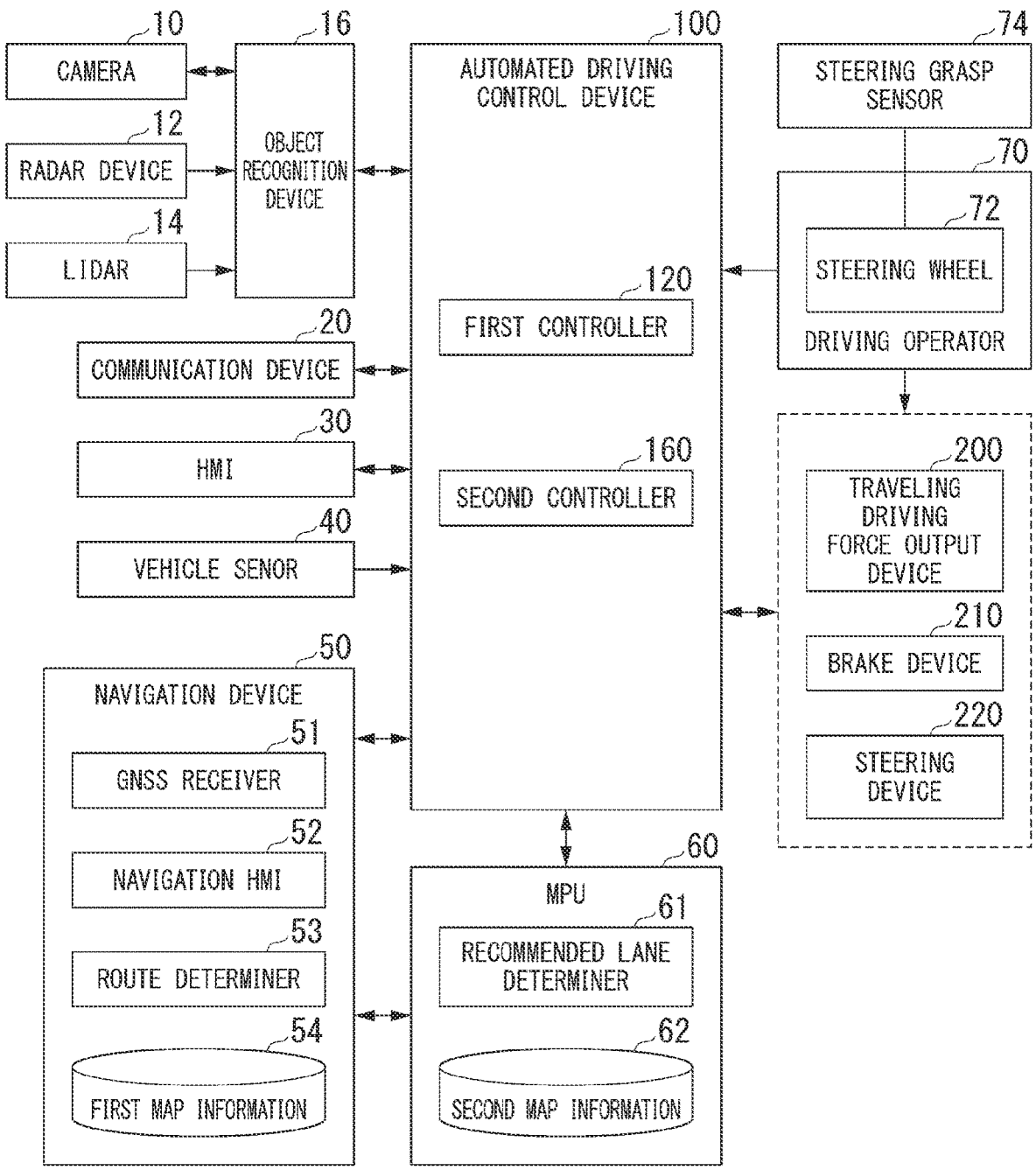
FIG. 1 is a configuration diagram of a vehicle system using an object recognition device according to an embodiment.

FIG. 1 is a configuration diagram of a vehicle system 1 using an object recognition device according to the embodiment. A vehicle having the vehicle system 1 mounted therein is, for example, a two-wheeled, three-wheeled, or four-wheeled vehicle or the like, and the driving source thereof is an internal-combustion engine such as a diesel engine or a gasoline engine, an electric motor, or a combination thereof. The electric motor operates using power generated by a generator connected to an internal-combustion engine or discharging power of a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle senor 40, a navigation device 50, a map positioning unit (MPU) 60, a driving operator 70, an automated driving control device 100, a traveling driving force output device 200, a brake device 210, and a steering device 220. These devices or instruments are connected to each other through a multiplex communication line such as a controller area network (CAN) communication line, a serial communication line, a wireless communication network, or the like. Meanwhile, the configuration shown in FIG. 1 is merely an example, and some portions of the configuration may be omitted, or other configurations may be further added.

The camera 10 is a digital camera using a solid-state imaging element such as, for example, a charge coupled device (CCD) or a complementary metal oxide semiconductor (CMOS). The camera 10 is installed at any point on a vehicle having the vehicle system 1 mounted therein (hereinafter referred to as a host vehicle M). In a case where a forward image is captured, the camera 10 is installed on an upper portion of a front windshield, a rear surface of a rear-view mirror, or the like. In a case where a backward image is captured, the camera 10 is installed on an upper portion of a rear windshield, a back door, or the like. In a case where a sideward image is captured, the camera 10 is installed on a side mirror or the like. The camera 10, for example, repeatedly captures an image of surroundings of the host vehicle M periodically. The camera 10 may be a stereo camera.

The radar device 12 radiates radio waves such as millimeter waves to the surroundings of the host vehicle M, and detects radio waves (reflected waves) reflected from an object to detect at least the position (distance to and orientation of) of the object. The radar device 12 is installed at any point on the host vehicle M. The radar device 12 may detect the position and speed of an object with a frequency modulated continuous wave (FM-CW) system.

The LIDAR 14 irradiates the surroundings of the host vehicle M with light (or electromagnetic waves having a wavelength close to that of light), and measures scattered light. The LIDAR 14 detects a distance to an object on the basis of a time from light emission to light reception. The irradiation light is, for example, pulsed laser light. The LIDAR 14 is installed at any point on the host vehicle M.

The object recognition device 16 recognizes the position, type, speed, or the like of an object by performing a sensor fusion process on the results of detection performed by some or all of the camera 10, the radar device 12, and the LIDAR 14. The object recognition device 16 outputs the recognition results to the automated driving control device 100. The object recognition device 16 may output the detection results of the camera 10, the radar device 12, and the LIDAR 14, as they are, to the automated driving control device 100. The object recognition device 16 may be omitted from the vehicle system 1.

The communication device 20 communicates with another vehicle which is present in the surroundings of the host vehicle M using, for example, a cellular network, a Wi-Fi network, Bluetooth (registered trademark), dedicated short range communication (DSRC), or the like, or communicates with server devices of various types through a wireless base station.

The HMI 30 presents various types of information to an occupant of the host vehicle M, and accepts the occupant's input operation. The HMI 30 includes various display devices, a speaker, a buzzer, a touch panel, a switch, a key, and the like.

The vehicle sensor 40 includes a vehicle speed sensor that detects the speed of the host vehicle M, an acceleration sensor that detects an acceleration, an orientation sensor that detects the direction of the host vehicle M, or the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory.

The GNSS receiver 51 specifies the position of the host vehicle M on the basis of a signal received from a GNSS satellite (radio waves arriving from an artificial satellite). The position of the host vehicle M may be specified or complemented by an inertial navigation system (INS) in which an output of the vehicle sensor 40 is used. The navigation HMI 52 includes a display device, a speaker, a touch panel, a key, and the like. A portion or the entirety of the navigation HMI 52 may be shared with the above-described HMI 30. The route determiner 53 determines, for example, a route (hereinafter, a route on a map) from the position (or any input position) of the host vehicle M specified by the GNSS receiver 51 to a destination input by an occupant using the navigation HMI 52 with reference to the first map information 54.

The first map information 54 is, for example, information in which a road shape is represented by a link indicating a road and nodes connected by the link. The first map information 54 may include the curvature of a road, point of interest (POI) information, or the like. The route on a map is output to the MPU 60. The navigation device 50 may perform route guidance using the navigation HMI 52 on the basis of the route on a map. The navigation device 50 may be realized by the function of a terminal device such as, for example, a smartphone or a tablet terminal possessed by an occupant. The navigation device 50 may transmit its current position and destination to a navigation server through the communication device 20, and may acquire the same route as the route on a map from the navigation server.

The MPU 60 includes, for example, a recommended lane determiner 61, and holds second map information 62 in a storage device such as an HDD or a flash memory. The recommended lane determiner 61 is realized by a hardware processor (computer) such as a central processing unit (CPU) executing a program (software). In addition, the recommended lane determiner 61 may be realized by hardware (a circuit unit; including circuitry) such as a large scale integration (LSI), an application specific integrated circuit (ASIC), a field-programmable gate array (FPGA), or a graphics processing unit (GPU), and may be realized by software and hardware in cooperation. The program may be stored in a storage device (a storage device including a non-transitory storage medium) of the MPU 60 in advance, may be stored in a detachable storage medium such as a DVD or a CD-ROM, or may be installed in the storage device of the MPU 60 by the storage medium (non-transitory storage medium) being mounted in a drive device.

The recommended lane determiner 61 divides the route on a map provided from the navigation device 50 into a plurality of blocks (for example, divides the route on a map every 100 [m] in a vehicle traveling direction), and determines a recommended lane for each block with reference to the second map information 62. The recommended lane determiner 61 makes a determination on which lane from the left to travel in. In a case where a branch point is present in the route on a map, the recommended lane determiner 61 determines a recommended lane so that the host vehicle M can travel along a logical route for advancing to a branch destination.

The second map information 62 is map information having a higher accuracy than the first map information 54. The second map information 62 includes, for example, information on the center of a lane (a road central line, a central line), information on the boundary of a lane (a road partition line, a partition line), or the like. In addition, the second map information 62 may include road information (a road structure such as a road mark or a traffic signal), traffic regulation information, address information (an address or a postal code), facility information, telephone number information, or the like. The second map information 62 may be updated when necessary by the communication device 20 communicating with another device.

The driving operator 70 includes, for example, an accelerator pedal, a brake pedal, a shift lever, and other operators in addition to a steering wheel 72. A sensor that detects the amount of operation or the presence or absence of operation is installed on the driving operator 70. The detection result of the sensor is output to the automated driving control device 100 or is output to some or all of the traveling driving force output device 200, the brake device 210, and the steering device 220. The steering wheel 72 does not necessarily have to be annular, and may be in the form of a variant steering wheel, a joystick, a button, or the like. A steering grasp sensor 74 is installed on the steering wheel 72. The steering grasp sensor 74 is realized by a capacitance sensor or the like, and outputs a signal that makes it possible to detect whether a driver is grasping the steering wheel 72 (which means that the driver is in contact with the steering wheel while applying force) to the automated driving control device 100.

The automated driving control device 100 includes, for example, a first controller 120 and a second controller 160. The first controller 120 and the second controller 160 are realized by a hardware processor (computer) such as, for example, a CPU executing a program (software). In addition, some or all of these components may be realized by hardware (a circuit unit; including circuitry) such as an LSI, an ASIC, an FPGA, or a GPU, or may be realized by software and hardware in cooperation. The program may be stored in an HDD of the automated driving control device 100 or in a storage device such as a flash memory (a storage device including a non-transitory storage medium) in advance, may be stored in a detachable storage medium such as a DVD or a CD-ROM, or may be installed in the HDD of the automated driving control device 100 or in the flash memory by the storage medium (non-transitory storage medium) being mounted in a drive device.

Figure 2:
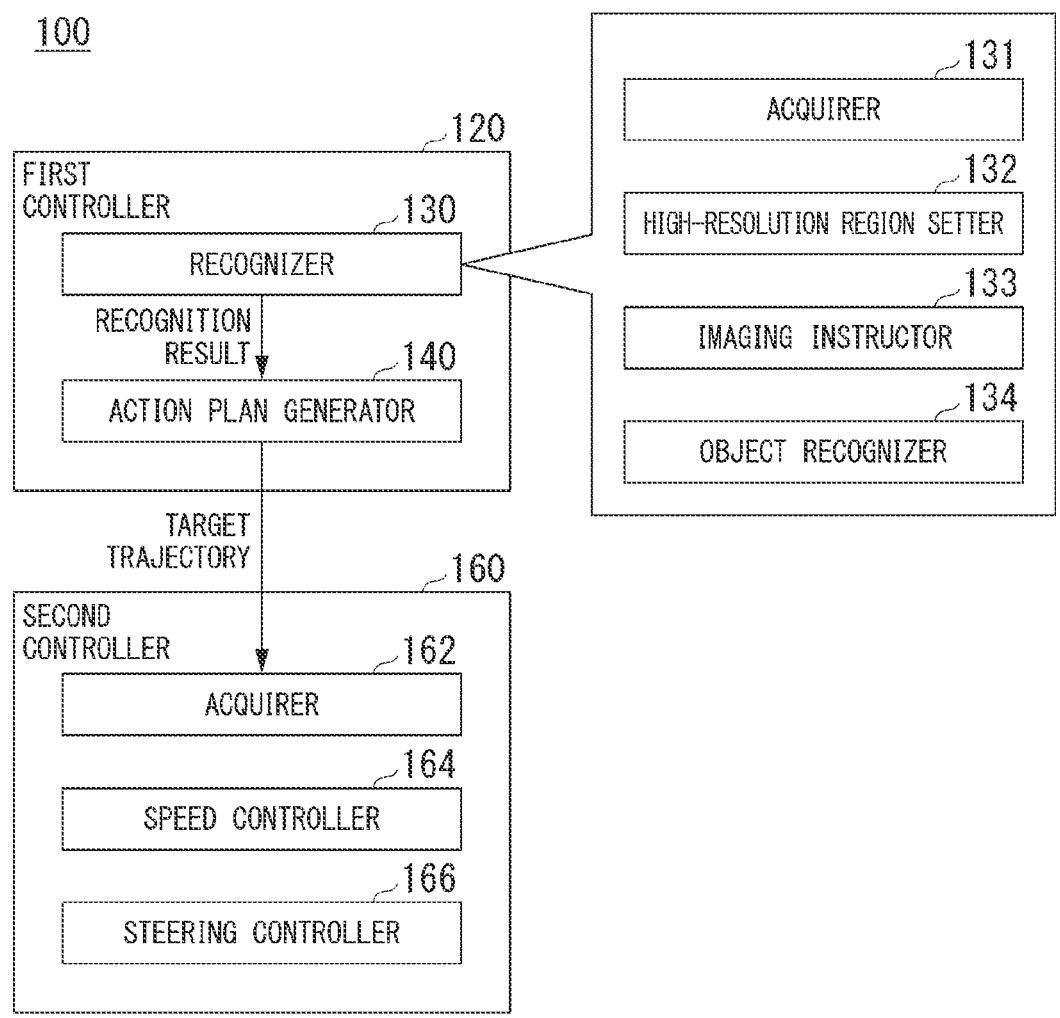
FIG. 2 is a functional configuration diagram of a first controller and a second controller according to the embodiment.

FIG. 2 is a functional configuration diagram of the first controller 120 and the second controller 160. The first controller 120 includes, for example, a recognizer 130 and an action plan generator 140. The automated driving control device 100, the first controller 120, or the recognizer 130 is an example of the "object recognition device".

The first controller 120 concurrently realizes, for example, a function based on artificial intelligence (AI) and a function based on a model imparted in advance. For example, a function of "recognizing a point of intersection" may be realized by the recognition of a point of intersection based on deep learning or the like and recognition based on conditions (such as a signal or a road sign on which pattern matching is possible) imparted in advance being concurrently executed, and performing comprehensive evaluation by performing scoring on both. Thereby, the reliability of automated driving is secured.

The recognizer 130 recognizes the state of the position, speed, acceleration, and the like of an object located in the surroundings of the host vehicle M on the basis of at least a portion of information which is input from the camera 10, the radar device 12, and the LIDAR 14. The position of the object is recognized as, for example, a position in absolute coordinates with a representative point (such as the centroid or the center of a drive shaft) of the host vehicle M as an origin, and is used in control. The position of the object may be represented by a representative point such as the centroid or a corner of the object, or may be represented by a region. The "state" of the object may include the acceleration or jerk of the object, or an "action state" (for example, whether it is performing or attempting to perform a lane change).

The recognizer 130 recognizes, for example, a lane (traveling lane) along which the host vehicle M travels. For example, the recognizer 130 recognizes a traveling lane by comparing the pattern of a road partition line (for example, an array of solid lines and broken lines) obtained from the second map information 62 with the pattern of a road partition line located in the surroundings of the host vehicle M which is recognized from an image captured by the camera 10. Meanwhile, the recognizer 130 may recognize a traveling lane by recognizing a driving boundary (road boundary) including a road partition line, a shoulder, a curbstone, a median strip, a guardrail, or the like without being limited to the recognition of a road partition line. In this recognition, the position of the host vehicle M acquired from the navigation device 50 or processing results based on an INS may be added. In addition, the recognizer 130 recognizes a stop line, an obstacle, a red light, a tollbooth, and other road events.

Upon recognizing a traveling lane, the recognizer 130 recognizes the position or posture of the host vehicle M with respect to the traveling lane. The recognizer 130 may recognize, for example, deviation of the host vehicle M from the center of the lane which is a reference point, and an angle formed with respect to a line aligned with the center of the lane of the host vehicle M in its traveling direction, as the relative position and posture of the host vehicle M with respect to the traveling lane. Instead, the recognizer 130 may recognize the position of the reference point of the host vehicle M or the like with respect to either lateral end portion (a road partition line or a road boundary) of the traveling lane, as the relative position of the host vehicle M with respect to the traveling lane.

The recognizer 130 includes, for example, an acquirer 131, a high-resolution region setter 132, an imaging instructor 133, and an object recognizer 134. The acquirer 131 acquires information which is input from the camera 10, the radar device 12, and the LIDAR 14. The high-resolution region setter 132 is an example of the "setting unit". The object recognizer 134 is an example of the "recognizer".

The high-resolution region setter 132 sets a high-resolution region to be subjected to a process on a surrounding image obtained by capturing an image of the surroundings of the host vehicle M with the camera 10 at a higher resolution than other regions in the surrounding image. For example, the high-resolution region setter 132 sets a high-resolution region in which an image of a high resolution (hereinafter referred to as a "high-resolution image") is required to be acquired for a surrounding image of a low resolution (hereinafter referred to as a "low-resolution image") captured by the camera 10. First, the high-resolution region setter 132 acquires information on the surroundings of the traveling host vehicle M on the basis of the low-resolution image captured by the camera 10. This surrounding information indicates the general condition of surroundings such as the type of an object located in the surroundings of the host vehicle M and the rough position of the object. The high-resolution region setter 132 acquires the information on the surroundings of the traveling host vehicle M, for example, by performing image analysis such as pattern matching on a low-resolution image. Meanwhile, the high-resolution region setter 132 may acquire the information on the surroundings of the traveling host vehicle M on the basis of information which is input from the radar device 12 and the LIDAR 14. In addition, the high-resolution region setter 132 may acquire the information on the surroundings of the host vehicle M on the basis of the second map information 62 stored in a storage device of the MPU 60.

Next, the high-resolution region setter 132 sets a high-resolution region for a low-resolution image on the basis of the acquired surrounding information. For example, the high-resolution region setter 132 sets a region including another vehicle in the low-resolution image as the high-resolution region. The high-resolution region setter 132 determines a region including another vehicle by performing image analysis on the low-resolution image, and sets the determined region as the high-resolution region. Alternatively, the high-resolution region setter 132 sets a region including a traffic structure in the low-resolution image as the high-resolution region. The high-resolution region setter 132 determines a region including a traffic structure by performing image analysis on the low-resolution image, and sets the determined region as the high-resolution region. Examples of road structures include road marks, traffic signals, curbstones, median strips, guardrails, fences, walls, railroad crossings, and the like. In addition, examples of road structures may include road surface marks such as road partition lines, pedestrian crossings, bicycle crossings, and stop lines which are painted on or affixed to the road surface. Meanwhile, the high-resolution region setter 132 may set a high-resolution region on the basis of the state of a road on which the host vehicle M is traveling (a road curvature or the like) or the traveling condition of the host vehicle M such as the vehicle speed of the host vehicle M.

Alternatively, the high-resolution region setter 132 sets a high-resolution region with respect to a surrounding image captured by the camera 10 (for example, a surrounding image captured at a high resolution) on the basis of the acquired surrounding information. For example, the high-resolution region setter 132 sets a region including another vehicle in the surrounding image as the high-resolution region. The high-resolution region setter 132 determines a region including another vehicle by performing image analysis on the surrounding image at a low resolution, and sets the determined region as the high-resolution region. Alternatively, the high-resolution region setter 132 sets a region including a traffic structure in the surrounding image as the high-resolution region. The high-resolution region setter 132 determines a region including a traffic structure by performing image analysis on the surrounding image, and sets the determined region as the high-resolution region.

That is, the high-resolution region setter 132 sets a high-resolution region to be subjected to a process on a surrounding image (first image) obtained by capturing an image of the surroundings of the host vehicle M at a higher resolution than other regions in the surrounding image on the basis of the information on the surroundings of the host vehicle M.

The imaging instructor 133 transmits an imaging instruction for capturing a high-resolution image of a high-resolution region which is set by the high-resolution region setter 132 to the camera 10. The camera 10 having received this imaging instruction captures an image of a region near the host vehicle M corresponding to a high-resolution region at a high resolution, and transmits the captured high-resolution image to the automated driving control device 100. Thereby, the acquirer 131 acquires a high-resolution image of the set high-resolution region.

The object recognizer 134 recognizes detailed information on an object located in the surroundings of the host vehicle M by processing an image corresponding to the high-resolution region which is set by the high-resolution region setter 132 at a high resolution. For example, the object recognizer 134 recognizes the state of a lighting portion (such as a blinker or a brake lamp) of another vehicle, the contents or state of a road structure, or the like included in the high-resolution image, and recognizes detailed information on an object.

That is, the object recognizer 134 recognizes an object by processing an image of a high-resolution region in a surrounding image (first image) at a high resolution. In addition, the object recognizer 134 recognizes an object by processing a high-resolution image (second image) obtained by capturing a high-resolution image of a region near the vehicle corresponding to the high-resolution region at a high resolution.

The action plan generator 140 generates a target trajectory along which the host vehicle M will travel in the future automatically (irrespective of a driver's operation) so that the host vehicle M travels in the recommended lane determined by the recommended lane determiner 61 in principle and can cope with the peripheral situation of the host vehicle. The target trajectory includes, for example, a speed element. For example, the target trajectory may be represented as a trajectory obtained by arranging points (trajectory points) at which the host vehicle M will arrive in order. The trajectory points are points at which the host vehicle M will arrive after predetermined traveling distances (for example, approximately every several [m]) which are distances along a road. Separately from the trajectory points, a target speed and a target acceleration for each predetermined sampling time (for example, several tenths of a [sec]) are generated as a portion of the target trajectory. In addition, the trajectory points may be positions at which the host vehicle M will arrive at sampling times for respective predetermined sampling times. In this case, information of a target speed or target acceleration is represented by an interval between trajectory points.

The action plan generator 140 may set automated driving events when generating a target trajectory. Examples of automated driving events include a constant-speed traveling event, a low-speed following traveling event, a lane change event, a diverging event, a merging event, a passing event, and the like. The action plan generator 140 generates a target trajectory according to a started event.

The second controller 160 controls the traveling driving force output device 200, the brake device 210, and the steering device 220 so that the host vehicle M passes along the target trajectory generated by the action plan generator 140 according to scheduled times.

The second controller 160 includes, for example, an acquirer 162, a speed controller 164, and a steering controller 166. The acquirer 162 acquires information of the target trajectory (trajectory point) generated by the action plan generator 140, and stores the acquired information in a memory (not shown). The speed controller 164 controls the traveling driving force output device 200 or the brake device 210 on the basis of a speed element associated with the target trajectory stored in the memory. The steering controller 166 controls the steering device 220 in accordance with the bent state of the target trajectory stored in the memory. The processes of the speed controller 164 and the steering controller 166 are realized by, for example, a combination of feedforward control and feedback control. As an example, the steering controller 166 executes a combination of feedforward control according to the curvature of a road in front of the host vehicle M and feedback control based on deviation from the target trajectory.

The traveling driving force output device 200 outputs a traveling driving force (torque) for a vehicle to travel to a driving wheel. The traveling driving force output device 200 includes, for example, a combination of an internal-combustion engine, an electric motor, a transmission or the like, and an electronic control unit (ECU) that controls these components. The ECU controls the above components in accordance with information which is input from the second controller 160 or information which is input from the driving operator 70.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which is input from the second controller 160 or the information which is input from the driving operator 70, and causes a brake torque according to a braking operation to be output to each wheel. The brake device 210 may include a mechanism that transfers hydraulic pressure generated by the operation of a brake pedal included in the driving operator 70 through a master cylinder to the cylinder as a backup. Meanwhile, the brake device 210 is not limited to the above-described configuration, and may be an electronic control type hydraulic brake device that controls an actuator in accordance with the information which is input from the second controller 160 and that transfers hydraulic pressure of the master cylinder to the cylinder.

The steering device 220 includes, for example, a steering ECU and an electric motor. The electric motor changes the direction of a turning wheel, for example, by causing a force to act on a rack and pinion mechanism. The steering ECU drives the electric motor in accordance with the information which is input from the second controller 160 or the information which is input from the driving operator 70, and changes the direction of the turning wheel.

Figure 3:
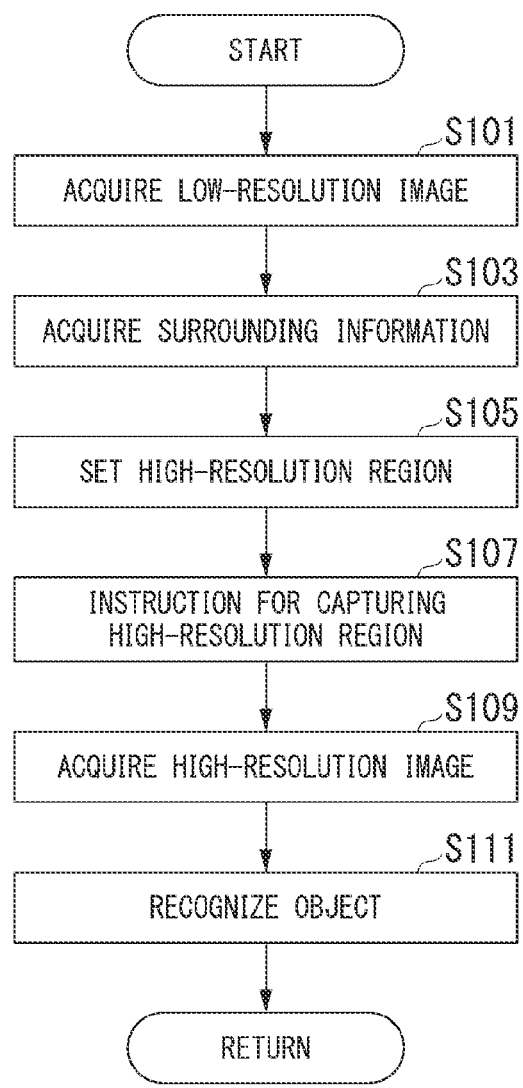
FIG. 3 is a flowchart showing an example of an object recognition process performed by a recognizer of an automated driving control device according to the embodiment.

Hereinafter, an object recognition process will be described with reference to a flowchart. FIG. 3 is a flowchart showing an example of an object recognition process performed by the recognizer 130 of the automated driving control device 100 according to the embodiment. Hereinafter, a case where the host vehicle M is performing automated driving under control of automated driving performed by the automated driving control device 100 will be described as an example. The object recognition process of the flowchart shown in FIG. 3 is repeatedly executed while the host vehicle M is performing automated driving.

(1) Process of Setting High-Resolution Region Based on Presence of Other Vehicle First, a process of setting a high-resolution region based on the presence of another vehicle will be described. FIGS. 4A to 4D are diagrams showing an example of setting a high-resolution region on the basis of the presence of another vehicle according to the embodiment.

Figure 4A:
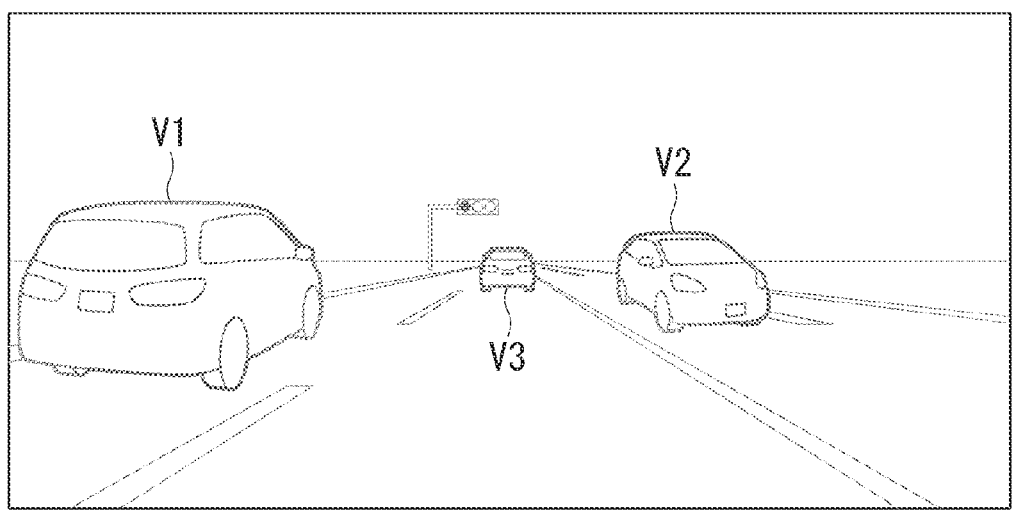
FIG. 4A is a diagram showing an example of setting a high-resolution region on the basis of the presence of another vehicle according to the embodiment.
Figure 4B:
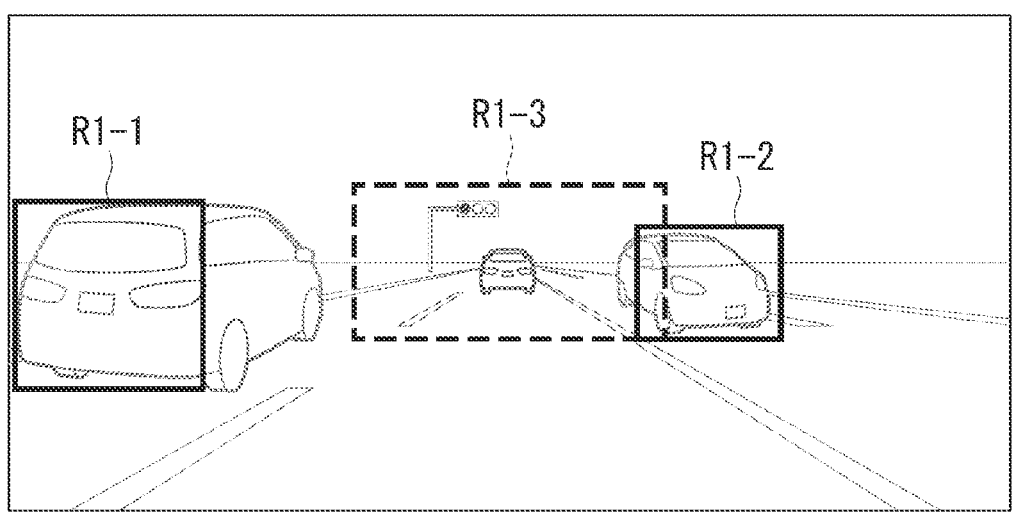
FIG. 4B is a diagram showing an example of setting a high-resolution region on the basis of the presence of the other vehicle according to the embodiment.

First, the acquirer 131 acquires a surrounding image captured by the camera 10 (step S101). For example, the acquirer 131 acquires a surrounding image LR1 obtained by capturing an image of a space in the traveling direction of the host vehicle M as shown in FIG. 4A. Meanwhile, the acquirer 131 may acquire information which is input from the radar device 12 or the LIDAR 14 in addition to the information which is input from the camera 10.

Next, the high-resolution region setter 132 acquires information on the surroundings of the traveling host vehicle M by processing the acquired surrounding image LR1 at a low resolution (step S103). The high-resolution region setter 132 acquires the information on the surroundings of the traveling host vehicle M, for example, by performing image analysis such as pattern matching on the surrounding image LR1. Meanwhile, the high-resolution region setter 132 may acquire the information on the surroundings of the traveling host vehicle M on the basis of the information which is input from the radar device 12 or the LIDAR 14. For example, in a case where the surrounding image LR1 as shown in FIG. 4A is acquired, the high-resolution region setter 132 acquires rough information relating to another vehicle such as the presence or absence of another vehicle located in a space in the traveling direction of the host vehicle M, the position of the other vehicle, or a distance from the other vehicle. In the example shown in FIG. 4A, the high-resolution region setter 132 recognizes two other vehicles V1 and V3 traveling in a lane in the same direction as the host vehicle M and another vehicle V2 traveling in an opposite lane which are located in a space in the traveling direction of the host vehicle M.

Next, the high-resolution region setter 132 sets a high-resolution region for the surrounding image LR1 on the basis of the acquired surrounding information (step S105). In the example shown in FIG. 4B, the high-resolution region setter 132 recognizes the two other vehicles V1 and V2 within a predetermined distance in the surroundings of the host vehicle M, and sets a region including each of these other vehicles V1 and V2 as the high-resolution region. For example, the high-resolution region setter 132 sets two regions, that is, a region R1-1 including at least a rear portion of the other vehicle V1 and a region R1-2 including at least a front portion of the other vehicle V2, as the high-resolution region. On the other hand, in the example shown in FIG. 4B, the other vehicle V3 is far away from the host vehicle M and is not located within a predetermined distance. In this case, the high-resolution region setter 132 excludes the other vehicle V3 from a target for setting of a high-resolution region.

That is, the high-resolution region setter 132 sets a region including another vehicle in the surrounding image LR1 (first image) as the high-resolution region. In addition, the high-resolution region setter 132 determines a region including another vehicle by performing image analysis on the surrounding image LR1, and sets the determined region as the high-resolution region.

In addition, the high-resolution region setter 132 may recognize another vehicle traveling sideward or rearward of the host vehicle M on the basis of the information which is input from the camera 10, the radar device 12, and the LIDAR 14, and may set a region including the other vehicle as a high-resolution region when the other vehicle passes the host vehicle M and appears in front of the host vehicle M.

Figure 4C:
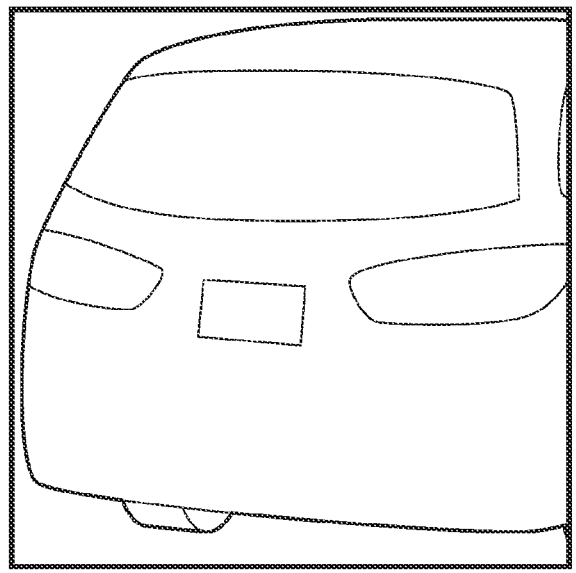
FIG. 4C is a diagram showing an example of setting a high-resolution region on the basis of the presence of the other vehicle according to the embodiment.
Figure 4D:
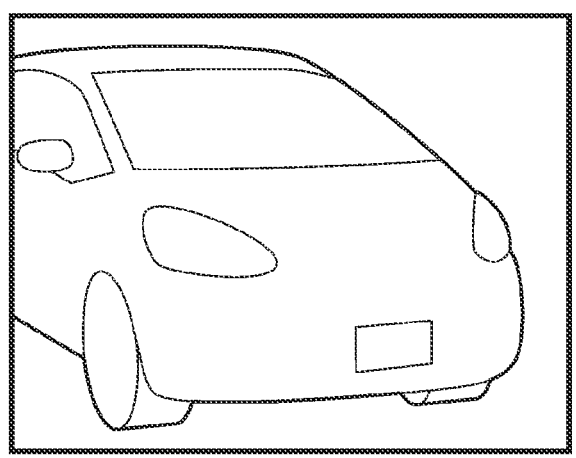
FIG. 4D is a diagram showing an example of setting a high-resolution region on the basis of the presence of the other vehicle according to the embodiment.

Next, the imaging instructor 133 transmits an imaging instruction for capturing a high-resolution image of the set high-resolution region to the camera 10 (step S107). The camera 10 having received this imaging instruction captures a region near the host vehicle M corresponding to a high-resolution region at a high resolution, and transmits the captured high-resolution image to the automated driving control device 100. Thereby, the acquirer 131 acquires a high-resolution image of the set high-resolution region (step S109). FIG. 4C shows a high-resolution image HR1-1 obtained by capturing an image of a region corresponding to the high-resolution region R1-1 shown in FIG. 4B at a high resolution. FIG. 4D shows a high-resolution image HR1-2 obtained by capturing an image of a region corresponding to the high-resolution region R1-2 shown in FIG. 4B at a high resolution.

Meanwhile, in a case where the acquirer 131 acquires both the low-resolution image and the high-resolution image of the information on the surroundings of the host vehicle M in step S101, a process of acquiring a high-resolution image in steps S107 and S109 may be omitted. In addition, in a case where the surrounding image used to acquire the information on the surroundings of the host vehicle M is a high-resolution image, the process of acquiring a high-resolution image in steps S107 and S109 may be omitted.

Next, the object recognizer 134 recognizes detailed information on an object located in the surroundings of the host vehicle M by processing the acquired high-resolution image or a partial image of the high-resolution region which is set in the surrounding image at a high resolution (step S111). For example, the object recognizer 134 recognizes the state of the lighting portion (such as a blinker or a brake lamp) of the other vehicle V1 or the like using the high-resolution image HR1-1 shown in FIG. 4C, and recognizes the operation state of the other vehicle V1. In addition, for example, the object recognizer 134 recognizes the state of the lighting portion (such as a blinker or a brake lamp) of the other vehicle V2 or the like using the high-resolution image HR1-2 shown in FIG. 4D, and recognizes the operation state of the other vehicle V2. After that, the action plan generator 140 generates a target trajectory using the acquired surrounding image and high-resolution image and the recognition result of the object recognizer 134, and the second controller 160 controls the traveling driving force output device 200, the brake device 210, and the steering device 220 so that the host vehicle M passes through the generated target trajectory at the scheduled time. This concludes the processing of the present flowchart.

That is, the high-resolution region setter 132 recognizes the operation state of the other vehicle on the basis of an image of the lighting portion of the other vehicle included in an image corresponding to the high-resolution region. In a case where there is a first other vehicle traveling in a lane in the same direction as the host vehicle M in the first image, the high-resolution region setter 132 sets a region including at least a rear portion of the first other vehicle as the high-resolution region, and in a case where there is a second other vehicle traveling in an opposite lane of the lane in which the vehicle is traveling in the first image, the high-resolution region setter sets a region including at least a front portion of the second other vehicle as the high-resolution region.

Figure 5A:
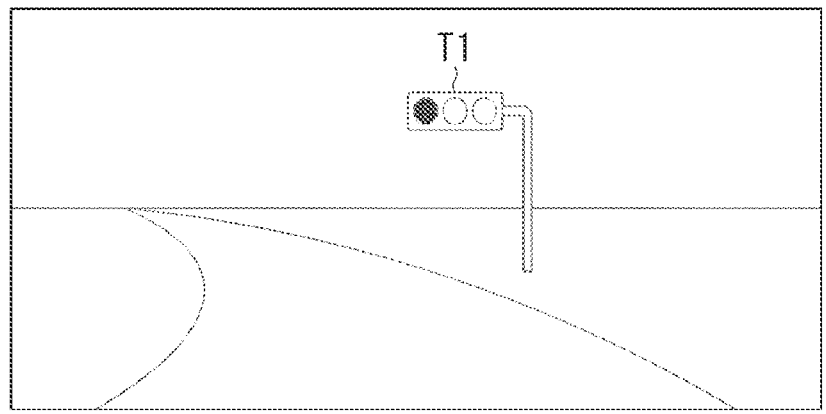
FIG. 5A is a diagram showing an example of setting a high-resolution region on the basis of the presence of a traffic structure according to the embodiment.
Figure 5B:
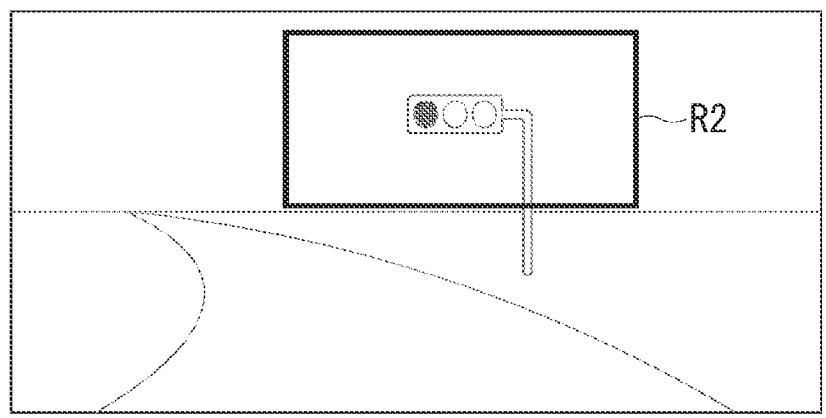
FIG. 5B is a diagram showing an example of setting a high-resolution region on the basis of the presence of the traffic structure according to the embodiment.
Figure 5C:
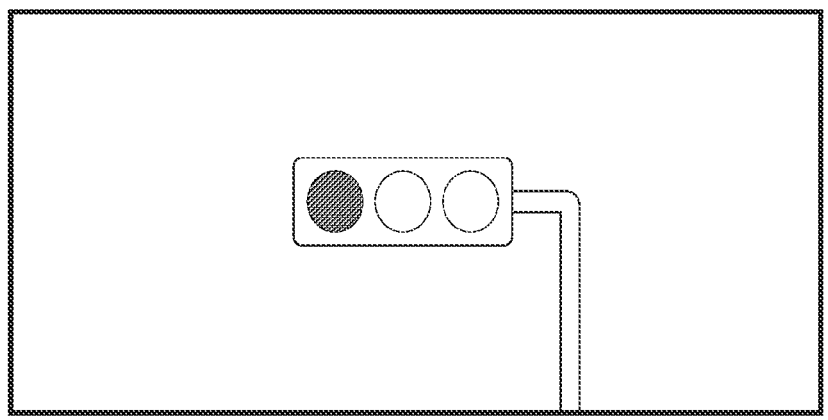
FIG. 5C is a diagram showing an example of setting a high-resolution region on the basis of the presence of the traffic structure according to the embodiment.

(2) Process of Setting High-Resolution Region Based on Presence of Road Structure Next, a process of setting a high-resolution region based on the presence of a road structure will be described. FIGS. 5A to 5C are diagrams showing an example of setting a high-resolution region on the basis of the presence of a traffic structure according to the embodiment.

First, the acquirer 131 acquires a surrounding image captured by the camera 10 (step S101). For example, the acquirer 131 acquires a surrounding image LR2 obtained by capturing an image of a space in the traveling direction of the host vehicle M as shown in FIG. 5A. Meanwhile, the acquirer 131 may acquire information which is input from the radar device 12 or the LIDAR 14 in addition to the information which is input from the camera 10.

Next, the high-resolution region setter 132 acquires the information on the surroundings of the traveling host vehicle M by processing the acquired surrounding image LR2 at a low resolution (step S103). The high-resolution region setter 132 acquires the information on the surroundings of the traveling host vehicle M, for example, by performing image analysis such as pattern matching on the surrounding image LR2. Meanwhile, the high-resolution region setter 132 may acquire the information on the surroundings of the traveling host vehicle M on the basis of the information which is input from the radar device 12 or the LIDAR 14. For example, in a case where the surrounding image LR2 as shown in FIG. 5A is acquired, the high-resolution region setter 132 acquires rough information relating to a road structure such as the presence or absence of the road structure located in a space in the traveling direction of the host vehicle M, the position of the road structure, or a distance from the road structure. In the example shown in FIG. 5A, the high-resolution region setter 132 recognizes a traffic signal T1 located in a space in the traveling direction of the host vehicle M.

Alternatively, the high-resolution region setter 132 may acquire the information on the surroundings of the host vehicle M on the basis of the second map information 62 stored in the storage device of the MPU 60. For example, the high-resolution region setter 132 recognizes rough information relating to a road structure such as the presence or absence of the road structure located in a space in the traveling direction of the host vehicle M, the position of the road structure, or a distance from the road structure on the basis of the second map information 62.

Next, the high-resolution region setter 132 sets a high-resolution region for the surrounding image LR2 on the basis of the acquired surrounding information (step S105). In the example shown in FIGS. 5A and 5B, the high-resolution region setter 132 recognizes the road structure (the traffic signal T1) within a predetermined distance in the surroundings of the host vehicle M, and sets a region including the traffic signal T1 as a high-resolution region R2.

Meanwhile, in a case where the high-resolution region setter 132 acquires the information on the surroundings of the host vehicle M on the basis of the second map information 62 in step S103, the high-resolution region setter 132 specifies the position of the road structure in the surrounding image LR2 by comparing and associating the pattern of a road partition line obtained from the second map information 62 or the position of the road structure with the pattern of a road partition line located in the surroundings of the host vehicle M which is recognized from an image captured by the camera 10. The high-resolution region setter 132 sets a high-resolution region including at least the specified road structure with respect to the surrounding image LR2.

That is, the high-resolution region setter 132 sets a region including the traffic structure in the surrounding image LR2 (first image) as the high-resolution region. In addition, the high-resolution region setter 132 determines a region including the traffic structure by performing image analysis on the first image, and sets the determined region as the high-resolution region. In addition, the high-resolution region setter 132 determines a region including the traffic structure using second map information (map information) including road information stored in advance, and sets the determined region as the high-resolution region.

Next, the imaging instructor 133 transmits an imaging instruction for capturing a high-resolution image of the set high-resolution region to the camera 10 (step S107). The camera 10 having received this imaging instruction captures a region near the host vehicle M corresponding to a high-resolution region at a high resolution, and transmits the captured high-resolution image to the automated driving control device 100. Thereby, the acquirer 131 acquires a high-resolution image of the set high-resolution region (step S109). FIG. 5C is a high-resolution image HR2 obtained by capturing an image of a region corresponding to the high-resolution region R2 shown in FIG. 5B at a high resolution.

Meanwhile, in a case where the acquirer 131 acquires both the low-resolution image and the high-resolution image of the information on the surroundings of the host vehicle M in step S101, a process of acquiring a high-resolution image in steps S107 and S109 may be omitted. In addition, in a case where the surrounding image used to acquire the information on the surroundings of the host vehicle M is a high-resolution image, the process of acquiring a high-resolution image in steps S107 and S109 may be omitted.

Next, the object recognizer 134 recognizes detailed information on an object located in the surroundings of the host vehicle M by processing the acquired high-resolution image or a partial image of the high-resolution region which is set in the surrounding image at a high resolution (step S111). For example, the object recognizer 134 recognizes the operation state of the traffic signal T1 (distinction between a red signal, a green signal, and a yellow signal) or the like using the high-resolution image HR2 shown in FIG. 5C. Thereafter, the action plan generator 140 generates a target trajectory using the acquired surrounding image and high-resolution image and the recognition result of the object recognizer 134, and the second controller 160 controls the traveling driving force output device 200, the brake device 210, and the steering device 220 so that the host vehicle M passes through the generated target trajectory at the scheduled time. This concludes the processing of the present flowchart.

(3) Process of Setting High-Resolution Region Based on Road Curvature

Figure 6A:
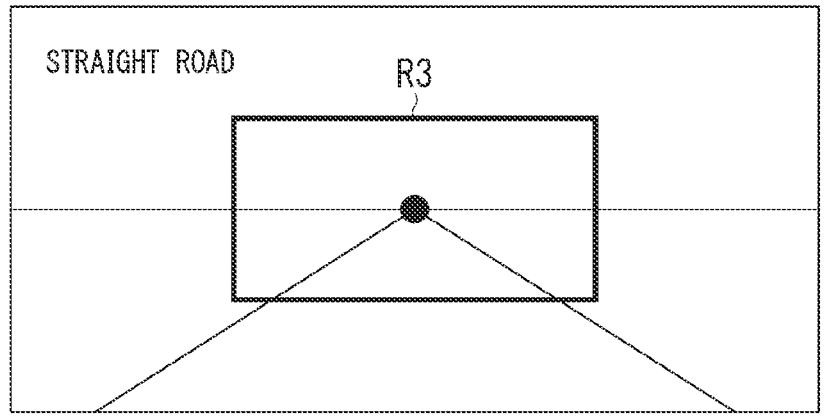
FIG. 6A is a diagram showing an example of setting a high-resolution region on the basis of the curvature of a road according to the embodiment.
Figure 6B:
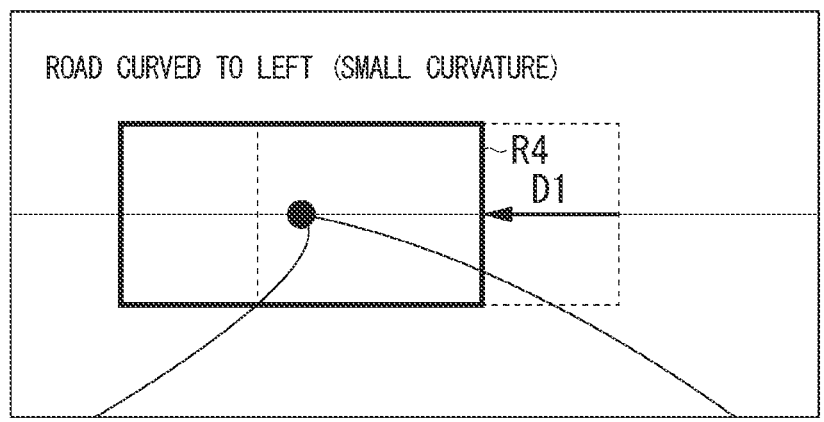
FIG. 6B is a diagram showing an example of setting a high-resolution region on the basis of the curvature of a road according to the embodiment.
Figure 6C:
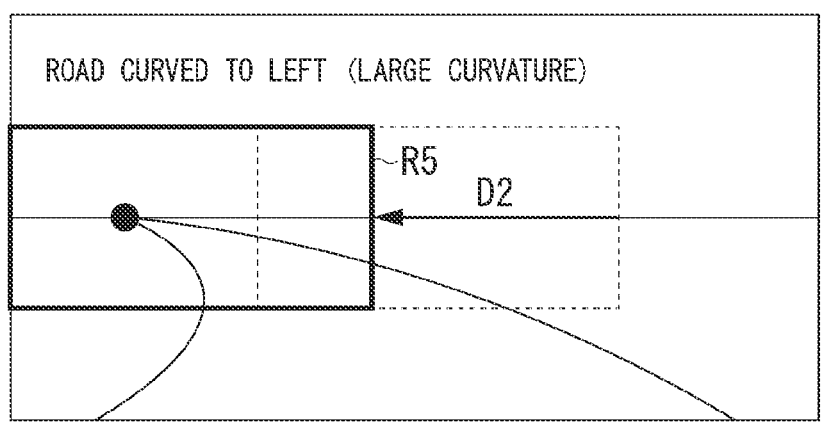
FIG. 6C is a diagram showing an example of setting a high-resolution region on the basis of the curvature of a road according to the embodiment.

Next, a process of setting a high-resolution region based on the curvature of a road will be described. FIGS. 6A to 6C are diagrams showing an example of setting a high-resolution region on the basis of the curvature of a road according to the embodiment.

First, the acquirer 131 acquires the surrounding information captured by the camera 10 (step S101). Meanwhile, the acquirer 131 may acquire information which is input from the radar device 12 or the LIDAR 14 in addition to the information which is input from the camera 10.

Next, the high-resolution region setter 132 acquires the information on the surroundings of the traveling host vehicle M by processing the acquired surrounding image at a low resolution (step S103). The high-resolution region setter 132 acquires the information on the surroundings of the traveling host vehicle M, for example, by performing image analysis such as pattern matching on the surrounding image. Meanwhile, the high-resolution region setter 132 may acquire the information on the surroundings of the traveling host vehicle M on the basis of the information which is input from the radar device 12 or the LIDAR 14. For example, the high-resolution region setter 132 recognizes the state of a road (such as the curvature of a road or the radius of curvature of a road) on which the host vehicle M is traveling. Meanwhile, the high-resolution region setter 132 may acquire the information on the surroundings of the host vehicle M on the basis of the second map information 62 stored in the storage device of the MPU 60.

Next, the high-resolution region setter 132 sets a high-resolution region for the surrounding image on the basis of the acquired surrounding information (step S105). Meanwhile, in a case where the high-resolution region setter 132 recognizes the peripheral situation of the host vehicle M on the basis of the second map information 62 in step S103, the high-resolution region setter 132 specifies the position of a road in the surrounding image by comparing and associating the pattern of a road partition line obtained from the second map information 62 with the pattern of a road partition line located in the surroundings of the host vehicle M which is recognized from an image captured by the camera 10. The high-resolution region setter 132 sets a high-resolution region for the surrounding image in accordance with the curvature of a road.

In a case where a surrounding image LR3 as shown in FIG. 6A is acquired, the high-resolution region setter 132 recognizes that the road on which the host vehicle M is traveling is a straight road. In this case, the high-resolution region setter 132 sets a high-resolution region R3 including a region of a predetermined size in front of the host vehicle M in its traveling direction in the surrounding image LR3.

On the other hand, in a case where a surrounding image LR4 as shown in FIG. 6B is acquired, the high-resolution region setter 132 recognizes that the road on which the host vehicle M is traveling is a road (of a small curvature) which is curved to the left. In this case, the high-resolution region setter 132 sets a high-resolution region R4 including a region of a predetermined size shifted by a distance D (D1) from the front of the host vehicle M in its traveling direction to the left in the surrounding image LR4. This distance D is set in accordance with the curvature of a road. The distance D is set to increase as the curvature of a road increases. By setting a high-resolution region in accordance with the curvature of a road in this way, it is possible to make a region which is a target for acquisition of a high-resolution image variable and to acquire high-accuracy information by limiting it to a necessary range.

On the other hand, in a case where a surrounding image LR5 as shown in FIG. 6C is acquired, the high-resolution region setter 132 recognizes that the road on which the host vehicle M is traveling is a road (of a large curvature) which is curved to the left. In this case, the high-resolution region setter 132 sets a high-resolution region R5 including a region of a predetermined size shifted by a distance D (D2) from the front of the host vehicle M in its traveling direction to the left in the surrounding image LR5. The road shown in FIG. 6C has a larger curvature than the road shown in FIG. 6B. Therefore, the distance D2 shown in FIG. 6C is set to have a larger value than the distance D1 shown in FIG. 6B.

Next, the imaging instructor 133 transmits an imaging instruction for capturing a high-resolution image of the set high-resolution region to the camera 10 (step S107). The camera 10 having received this imaging instruction captures a region near the host vehicle M corresponding to a high-resolution region at a high resolution, and transmits the captured high-resolution image to the automated driving control device 100. Thereby, the acquirer 131 acquires a high-resolution image of the set high-resolution region (step S109).

Meanwhile, in a case where the acquirer 131 acquires both the low-resolution image and the high-resolution image of the information on the surroundings of the host vehicle M in step S101, a process of acquiring a high-resolution image in steps S107 and S109 may be omitted. In addition, in a case where the surrounding image used to acquire the information on the surroundings of the host vehicle M is a high-resolution image, the process of acquiring a high-resolution image in steps S107 and S109 may be omitted.

Next, the object recognizer 134 recognizes detailed information on an object located in the surroundings of the host vehicle M by processing the acquired high-resolution image or a partial image of the high-resolution region which is set in the surrounding image at a high resolution (step S111). Thereafter, the action plan generator 140 generates a target trajectory using the acquired surrounding image and high-resolution image and the recognition result of the object recognizer 134, and the second controller 160 controls the traveling driving force output device 200, the brake device 210, and the steering device 220 so that the host vehicle M passes through the generated target trajectory at the scheduled time. This concludes the processing of the present flowchart.

(4) Process of Setting High-Resolution Region Based on Vehicle Speed

Figure 7A:
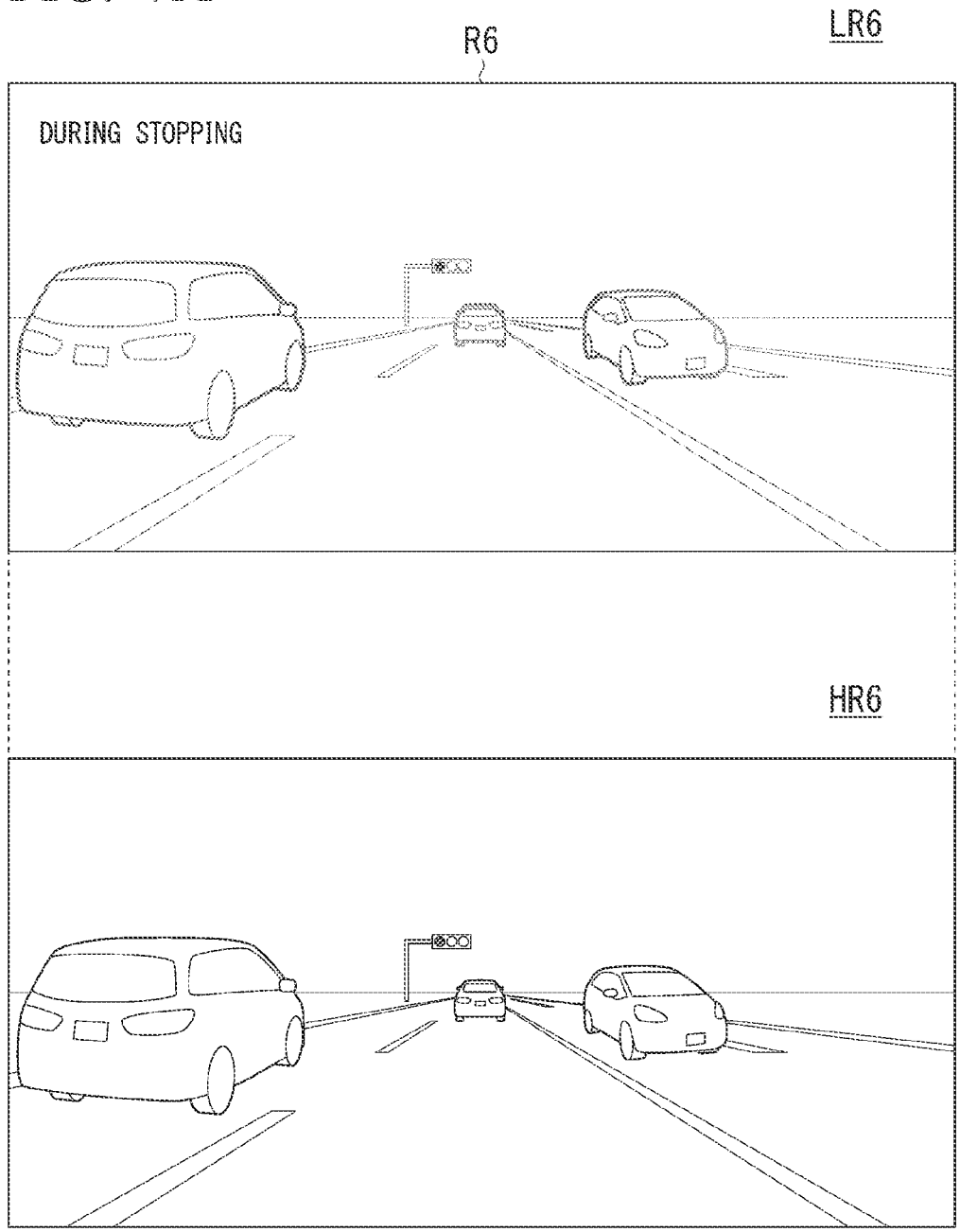
FIG. 7A is a diagram showing an example of setting a high-resolution region on the basis of a vehicle speed according to the embodiment.
Figure 7B:
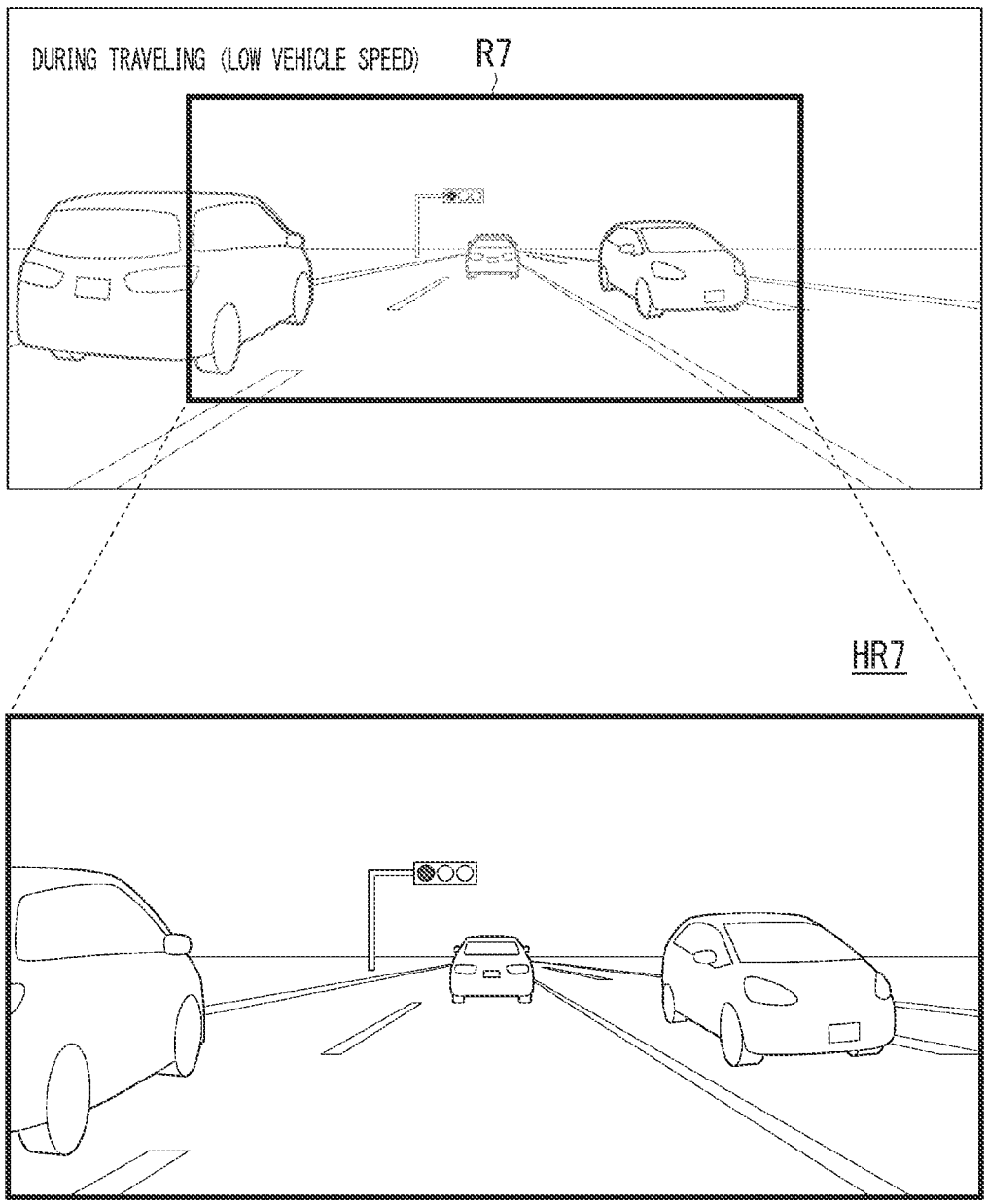
FIG. 7B is a diagram showing an example of setting a high-resolution region on the basis of a vehicle speed according to the embodiment.
Figure 7C:
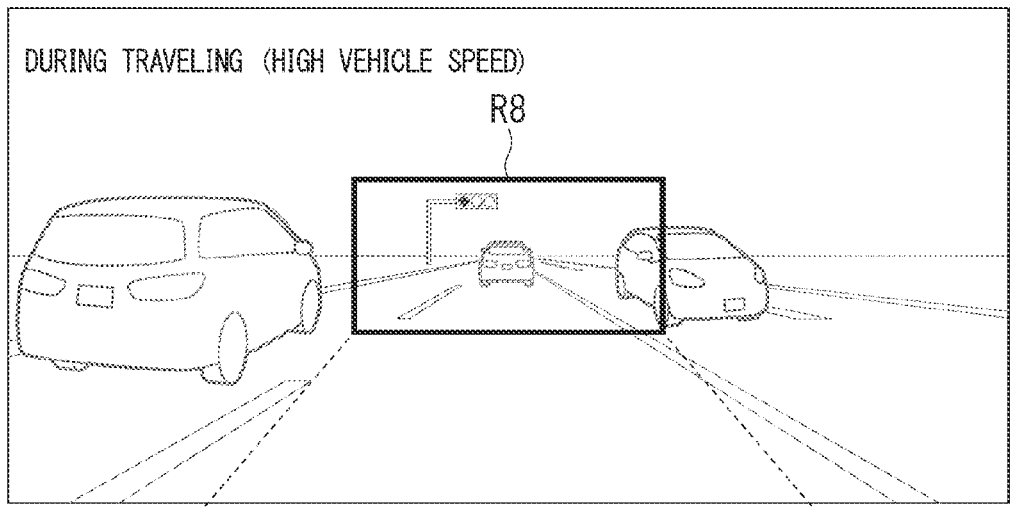
FIG. 7C is a diagram showing an example of setting a high-resolution region on the basis of a vehicle speed according to the embodiment.
Figure 7C:
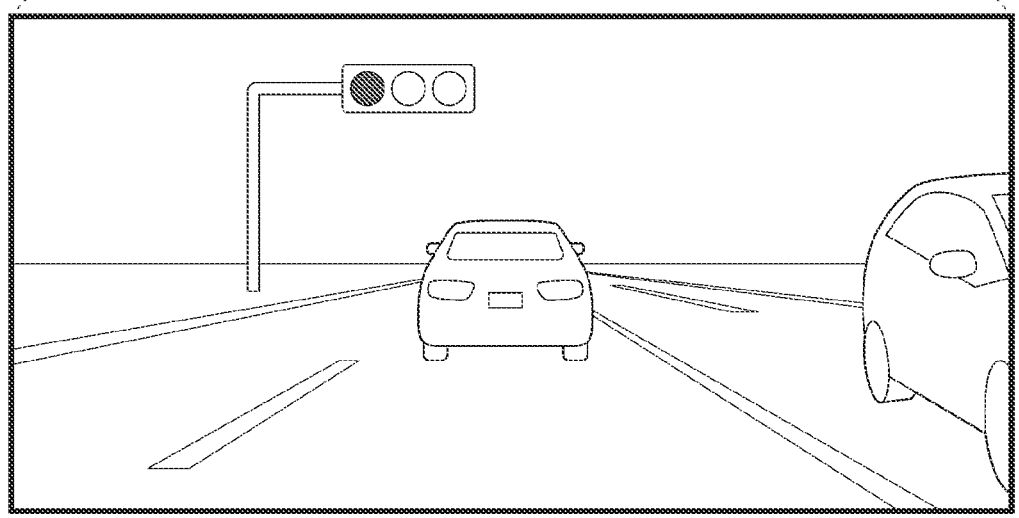

Next, a process of setting a high-resolution region based on a vehicle speed will be described. FIGS. 7A to 7C are diagrams showing an example of setting a high-resolution region on the basis of a vehicle speed according to the embodiment.

First, the acquirer 131 acquires a surrounding image captured by the camera 10 (step S101). Meanwhile, the acquirer 131 may acquire information which is input from the radar device 12 or the LIDAR 14 in addition to the information which is input from the camera 10.

Next, the high-resolution region setter 132 acquires the information on the surroundings of the traveling host vehicle M by processing the acquired surrounding image at a low resolution (step S103). The high-resolution region setter 132 acquires the information on the surroundings of the traveling host vehicle M, for example, by performing image analysis such as pattern matching on the surrounding image. Meanwhile, the high-resolution region setter 132 may acquire the information on the surroundings of the traveling host vehicle M on the basis of the information which is input from the radar device 12 or the LIDAR 14. Meanwhile, the process of step S103 may be omitted.

Next, the high-resolution region setter 132 sets a high-resolution region for the acquired surrounding image on the basis of the vehicle speed of the host vehicle M detected by the vehicle speed sensor of the vehicle sensor 40 (step S105).

Next, the imaging instructor 133 transmits an imaging instruction for capturing a high-resolution image of the set high-resolution region to the camera 10 (step S107). The camera 10 having received this imaging instruction captures a region near the host vehicle M corresponding to a high-resolution region at a high resolution, and transmits the captured high-resolution image to the automated driving control device 100. Thereby, the acquirer 131 acquires a high-resolution image of the set high-resolution region (step S109).

Meanwhile, in a case where the acquirer 131 acquires both the low-resolution image and the high-resolution image of the information on the surroundings of the host vehicle M in step S101, a process of acquiring a high-resolution image in steps S107 and S109 may be omitted. In addition, in a case where the surrounding image used to acquire the information on the surroundings of the host vehicle M is a high-resolution image, the process of acquiring a high-resolution image in steps S107 and S109 may be omitted.

FIG. 7A shows a surrounding image LR6 captured in a state where the host vehicle M has stopped (its vehicle speed is zero). In this case, the high-resolution region setter 132 sets a high-resolution region R6 including an entire region of the surrounding image LR6. An image of a region near the host vehicle M corresponding to the high-resolution region R6 is captured at a high resolution by the camera 10, and a high-resolution image HR6 is obtained.

FIG. 7B shows a surrounding image LR7 captured in a state where the host vehicle M is traveling (its vehicle speed is low). In this case, the high-resolution region setter 132 sets a high-resolution region R7 including a region in front of the host vehicle M in its traveling direction in the surrounding image LR7. The position and size of this high-resolution region R7 are set in accordance with the vehicle speed. As the vehicle speed increases, the high-resolution region R7 is set to be farther from the host vehicle and to be smaller in size. An image of a region near the host vehicle M corresponding to the high-resolution region R7 is captured at a high resolution by the camera 10, and a high-resolution image HR7 is obtained.

FIG. 7C shows a surrounding image LR8 captured in a state where the host vehicle M is traveling (its vehicle speed is high). In this case, the high-resolution region setter 132 sets a high-resolution region R8 including a region in front of the host vehicle M in its traveling direction in the surrounding image LR8. The size of this high-resolution region R8 is set in accordance with the vehicle speed. The vehicle speed in the example shown in FIG. 7C is higher than the vehicle speed in the example shown in FIG. 7B. Therefore, the position and size of the high-resolution region R8 in the case shown in FIG. 7C are set to be farther from the host vehicle and to be smaller in size than in the case shown in FIG. 7B. An image of a region near the host vehicle M corresponding to the high-resolution region R8 is captured at a high resolution by the camera 10, and a high-resolution image HR8 is obtained. By setting a high-resolution region in accordance with a vehicle speed in this way, it is possible to make a region which is a target for acquisition of a high-resolution image variable and to acquire high-accuracy information by limiting it to a necessary range.

Next, the object recognizer 134 recognizes detailed information on an object located in the surroundings of the host vehicle M by processing the acquired high-resolution image or a partial image of the high-resolution region which is set in the surrounding image at a high resolution (step S111). Thereafter, the action plan generator 140 generates a target trajectory using the acquired surrounding image and high-resolution image and the recognition result of the object recognizer 134, and the second controller 160 controls the traveling driving force output device 200, the brake device 210, and the steering device 220 so that the host vehicle M passes through the generated target trajectory at the scheduled time. This concludes the processing of the present flowchart.

According to the embodiment described above, the high-resolution region setter 132 (setting unit) that sets a high-resolution region to be subjected to a process on a surrounding image (first image) obtained by capturing an image of the surroundings of the host vehicle M (vehicle) at a higher resolution than other regions in the surrounding image on the basis of information on the surroundings of the vehicle and the object recognizer 134 (recognizer) that recognizes an object located in the surroundings of the vehicle by processing an image corresponding to the set high-resolution region at a high resolution are included, whereby it is possible to acquire information relating to an object having a high degree of importance among objects located in the surroundings of the vehicle in a short time without leaking the information. In this manner, by setting the high-resolution region on the basis of the information on the surroundings of the vehicle, it is possible to make a region which is a target for acquisition of a high-resolution image variable and to acquire a high-resolution image acquisition region by limiting it to a necessary range.

The above-described embodiment can be represented as follows.

An object recognition device including:
a storage device having a program stored therein; and
a hardware processor,
wherein the hardware processor is configured to execute the program to:
set a high-resolution region to be subjected to a process on a first image obtained by capturing an image of surroundings of a vehicle at a higher resolution than other regions in the first image based on information on the surroundings of the vehicle; and
recognize an object located in the surroundings of the vehicle by processing an image corresponding to the set high-resolution region at a high resolution.

While preferred embodiments of the invention have been described above, it should be understood that these are exemplary of the invention and are not to be considered as limiting. Additions, omissions, substitutions, and other modifications can be made without departing from the gist or scope of the present invention. Accordingly, the invention is not to be considered as being limited by the foregoing description, and is only limited by the scope of the appended claims.

What is claimed is:

1. An object recognition device comprising a processor configured to execute a program to:

set a high-resolution region to be subjected to a process on a first image obtained by capturing an image of surroundings of a vehicle at a higher resolution than other regions in the first image based on information on the surroundings of the vehicle; and recognize an object located in the surroundings of the vehicle by processing an image corresponding to the set high-resolution region at a high resolution, wherein, in a case where a road which is curved is recognized in the first image obtained by capturing an image of a traveling direction of the vehicle, the processor executes the program to set, as the high-resolution region, a region of a predetermined size shifted by a distance from the traveling direction of the vehicle to left or right, the distance being set in accordance with curvature of the road which is curved.

2. The object recognition device according to claim 1, wherein the processor executes the program to recognize the object by processing an image of the high-resolution region in the first image at a high resolution.

3. The object recognition device according to claim 1, wherein the processor executes the program to recognize the object by processing a second image obtained by capturing a high-resolution image of a region near the vehicle corresponding to the high-resolution region at a high resolution.

4. The object recognition device according to claim 1, wherein the processor executes the program to:
set a region including another vehicle in the first image as the high-resolution region; and
recognize the another vehicle.

5. The object recognition device according to claim 4, wherein the processor executes the program to:
determine a region including the another vehicle by performing image analysis on the first image; and
set the determined region as the high-resolution region.

6. The object recognition device according to claim 4, wherein the processor executes the program to recognize an operation state of the another vehicle based on an image of a lighting portion of the another vehicle included in the image corresponding to the high-resolution region.

7. The object recognition device according to claim 4, wherein, in a case where there is a first other vehicle traveling in a lane in the same direction as the vehicle in the first image, the processor executes the program to set a region including at least a rear portion of the first other vehicle as the high-resolution region, and
in a case where there is a second other vehicle traveling in an opposite lane of the lane in which the vehicle is traveling in the first image, the processor executes the program to set a region including at least a front portion of the second other vehicle as the high-resolution region.

8. The object recognition device according to claim 1, wherein the processor executes the program to:
set a region including a traffic structure in the first image as the high-resolution region; and
recognize the traffic structure.

9. The object recognition device according to claim 8, wherein the processor executes the program to:
determine a region including the traffic structure by performing image analysis on the first image; and
set the determined region as the high-resolution region.

10. The object recognition device according to claim 8, wherein the processor executes the program to:
determine a region including the traffic structure using map information including road information stored in advance; and
set the determined region as the high-resolution region.

11. The object recognition device according to claim 1, wherein, in a case where the high-resolution region is set in the traveling direction of the vehicle, the processor executes the program to set the high-resolution region so that as speed of the vehicle increases, the high-resolution region is set to be farther from the vehicle and to be smaller in size.

12. An object recognition method comprising causing a computer mounted in a vehicle to:
set a high-resolution region to be subjected to a process on a first image obtained by capturing an image of surroundings of the vehicle at a higher resolution than other regions in the first image based on information on the surroundings of the vehicle; and
recognize an object located in the surroundings of the vehicle by processing an image corresponding to the set high-resolution region at a high resolution,
wherein, in a case where a road which is curved is recognized in the first image obtained by capturing an image of a traveling direction of the vehicle, the object recognition method comprises causing the computer to set, as the high-resolution region, a region of a predetermined size shifted by a distance from the traveling direction of the vehicle to left or right, the distance being set in accordance with curvature of the road which is curved.

13. A non-transitory computer readable storage medium storing a program, the program causing a computer mounted in a vehicle to:
set a high-resolution region to be subjected to a process on a first image obtained by capturing an image of surroundings of the vehicle at a higher resolution than other regions in the first image based on information on the surroundings of the vehicle; and
recognize an object located in the surroundings of the vehicle by processing an image corresponding to the set high-resolution region at a high resolution,
wherein, in a case where a road which is curved is recognized in the first image obtained by capturing an image of a traveling direction of the vehicle, the program causes the computer to set, as the high-resolution region, a region of a predetermined size shifted by a distance from the traveling direction of the vehicle to left or right, the distance being set in accordance with curvature of the road which is curved.

* * * * *